US012575918B2

(12) United States Patent     (10) Patent No.:   US 12,575,918 B2
Nieves Pérez et al.        (45) Date of Patent:     Mar. 17, 2026

(54) WORKING MODEL TO PERFORM A DENTAL PROSTHESIS FOR A TOOTH STUMP, AND METHOD TO MAKE THE WORKING MODEL

(71) Applicant: Implant Protesis Dental 2004 S.L., Mataró Barcelona (ES)

(72) Inventors: Miguel Ángel Nieves Pérez, Mataró Barcelona (ES); David Espinach Villanueva, Mataró Barcelona (ES)

(73) Assignee: IMPLANT PROTESIS DENTAL 2004 S.L., Mataró Barcelona (ES)

( * ) Notice: Subject to any disclaimer, the term of this patent is extended or adjusted under 35 U.S.C. 154(b) by 269 days.

(21) Appl. No.: 18/554,703

(22) PCT Filed: Apr. 13, 2022

(86) PCT No.: PCT/EP2022/059881
§ 371 (c)(1),
(2) Date: Oct. 10, 2023

(87) PCT Pub. No.: WO2022/223398
PCT Pub. Date: Oct. 27, 2022

(65) Prior Publication Data
US 2024/0197452 A1     Jun. 20, 2024

(30) Foreign Application Priority Data
Apr. 19, 2021    (EP) .................................... 21382337

(51) Int. Cl.
*A61C 13/34*     (2006.01)
*A61C 9/00*      (2006.01)
(Continued)

(52) U.S. Cl.
CPC .............. *A61C 13/34* (2013.01); *A61C 9/002* (2013.01); *A61C 13/0019* (2013.01); *A61C 13/1009* (2013.01)

(58) Field of Classification Search
CPC ........ A61C 13/34; A61C 9/002; G09B 23/283
See application file for complete search history.

(56) References Cited

U.S. PATENT DOCUMENTS 4,840,565 A * 6/1989 Poveromo .............. A61C 9/002
                                      433/74
5,030,102 A * 7/1991 Lang .................... G09B 23/283
                                    434/263

(Continued)

FOREIGN PATENT DOCUMENTS

WO      2020065848 A1    4/2020

OTHER PUBLICATIONS

International Search Report from corresponding International Application No. PCT/EP2022/059881 mailed on Jul. 7, 2022, 3 pages.

*Primary Examiner* — Heidi M Eide
(74) *Attorney, Agent, or Firm* — Tucker Ellis LLP

(57) ABSTRACT
The invention relates to a working model to perform a dental prosthesis for a tooth stump, comprising a model mandible with teeth made from resin by means of 3D printing and a detachable model tooth stump. The model tooth stump comprises a main body made from resin by means of 3D printing and a rigid insert introduced in a housing formed in said main body. First fixing means comprised in the rigid insert cooperate with second fixing means, passing through the through holes made in the model mandible with teeth, for integrally attaching the model tooth stump to the model mandible with teeth in a detachable manner.

11 Claims, 6 Drawing Sheets

(51) Int. Cl.
  *A61C 13/00* (2006.01)
  *A61C 13/103* (2006.01)

(56) References Cited

U.S. PATENT DOCUMENTS

| 6,257,895 | B1 * | 7/2001 | Oestreich | G09B 23/34 |
| | | | | 434/274 |
| 2003/0044753 | A1 * | 3/2003 | Marotta | A61C 1/084 |
| | | | | 433/172 |
| 2007/0015111 | A1 * | 1/2007 | Kopelman | A61C 13/0004 |
| | | | | 433/213 |
| 2008/0227072 | A1 * | 9/2008 | Schulz | G09B 23/283 |
| | | | | 434/263 |
| 2011/0196524 | A1 * | 8/2011 | Giasson | B33Y 50/00 |
| | | | | 700/118 |
| 2012/0052465 | A1 * | 3/2012 | Von Both | A61C 9/002 |
| | | | | 433/213 |
| 2012/0291284 | A1 * | 11/2012 | Warden | A61C 13/0013 |
| | | | | 29/896.1 |
| 2013/0041630 | A1 * | 2/2013 | Gilles | A61C 9/002 |
| | | | | 703/1 |
| 2013/0216980 | A1 * | 8/2013 | Boronkay | A61C 13/1009 |
| | | | | 433/213 |
| 2014/0032183 | A1 * | 1/2014 | Fisker | A61C 13/0004 |
| | | | | 433/213 |
| 2018/0263739 | A1 * | 9/2018 | Simmonds | A61C 8/0001 |
| 2021/0315671 | A1 * | 10/2021 | Goto | A61C 9/002 |

* cited by examiner

1

WORKING MODEL TO PERFORM A DENTAL PROSTHESIS FOR A TOOTH STUMP, AND METHOD TO MAKE THE WORKING MODEL

RELATED APPLICATION DATA

This application is a national phase application of International Application No. PCT/EP2022/059881 filed Apr. 13, 2022, which claims priority to European Application No. 21382337.0 filed Apr. 19, 2021. The entireties of the aforementioned applications are incorporated herein by reference.

FIELD OF THE INVENTION

The invention is comprised in the field of dental prostheses.

More specifically, the invention relates to a working model to perform a dental prosthesis for a tooth stump, of the type comprising:

a model mandible with teeth, made from resin by means of 3D printing, comprising at least one toothless space, corresponding to a missing tooth in said model mandible with teeth, and at least one cavity facing said toothless space;

a model tooth stump which is placed in said toothless space and which is detachably coupled to said model mandible with teeth, said model tooth stump comprising a first end which is detachably introduced in said cavity and a second end extending from said first end and being in the form of a tooth stump.

The invention also relates to a method to make the working model.

STATE OF THE ART

Working models to which the invention relates, of the type indicated above, are specific for performing a dental prosthesis, such as a crown, for example, in the laboratory, said dental prosthesis being intended for being placed on a tooth stump previously performed in a patient's mouth. A tooth stump is a natural tooth in the patient's mouth which has been mechanically trimmed down, usually with a dental burr, to remove an upper part of the tooth, leaving only a part protruding from the gum which is suitably shaped in order to receive a dental prosthesis and thus restore a shape of the original tooth. The dental prosthesis is typically a ceramic piece custom made in the laboratory such that it fits in perfectly with the rest of the teeth in the patient's mandible when said prosthesis is fitted and cemented on the tooth stump. To perform the dental prosthesis in the laboratory, a physical working model which exactly reproduces the shape of the patient's mandible with teeth, or a part of same, with all the teeth, including the tooth stump on which the dental prosthesis is to be placed, is used. This working model has the particularity of comprising at least two parts: a model mandible with teeth having a toothless space in the location corresponding to the tooth stump and a model tooth stump detachably coupled to the model mandible with teeth, occupying said toothless space, such that these two parts coupled to one another exactly reproduce the patient's mandible. As a result of this two-part configuration, the technician who is to perform the dental prosthesis in the laboratory can remove the model tooth stump and place it in another support in order to more comfortably perform the dental prosthesis placed on said model tooth stump, without the obstacle created by the teeth of the model mandible with teeth adjacent to the model tooth stump. The technician can thereby repeatedly move the model tooth stump between this other support and the model mandible with teeth for testing purposes.

This two-part working model can be made of plaster based on the physical impressions taken in the patient's mandible. However, current technology allows the working model to be made from resin by means of 3D printing. To that end, the patient's mandible is scanned, for example, by means of an intraoral scan performed with a specific camera, thus obtaining a data set exactly defining the geometry of the patient's mandible. This duly processed data set is used to manufacture the two parts of the working model from resin by means of 3D printing.

The present invention relates to this latter technology, i.e., to working models manufactured from resin by means of 3D printing.

One difficulty that arises with the use of this 3D printing technology consists of how to achieve precise coupling of the two parts, i.e., the model mandible with teeth and the model tooth stump, such that these two parts exactly reproduce the geometry of the patient's real mandible when coupled together. Achieving this precision is extremely important because it will determine if the dental prosthesis manufactured in the laboratory fits in perfectly with the patient's real mandible once it is placed on the patient's real tooth stump. An imprecise coupling of the two parts prevents an exact reproduction of the geometry, despite the fact that this geometry is correctly defined in the data set.

Solutions which consist of forming, in the coupling regions of the two parts of the working model manufactured from resin by means of 3D printing, corresponding shapes, such as guides and inclined planes, for example, which contribute to increasing the precision of the coupling between the two parts, are known. EP2538869B1 and WO2019202110A1 disclose various solutions of this type.

US2013216980A1 discloses a solution in which a serpentine member is formed in the cavity of the model mandible as an integral part thereof. This serpentine member is deflected when the first end of the model tooth stump is introduced into the cavity, thereby generating an interface force which laterally pushes said first end against a corresponding shape of the cavity to ensure a correct position of the model tooth stump. The model tooth stump is fixed to the model mandible by a screw which passes through a through hole of the mandible.

A specific difficulty consists of the fact that resins used for 3D printing, particularly photosensitive resins, experience shrinkage which causes minor deviations in the geometry of the manufactured piece in comparison with the theoretical geometry defined in the data set. This shrinkage occurs after having manufactured the piece by 3D printing and is difficult to predict because it depends on a number of factors, such as the light exposure time, light intensity, the density of the hardened resin, the type of post-processing applied to the resin, the characteristics of the 3D printer used, and the typical characteristics of the resin. This shrinkage phenomenon occurs and has a negative effect on the precision of the coupling between the parts, despite the known solutions discussed above.

DESCRIPTION OF THE INVENTION

The purpose of the invention is to provide a working model to perform a dental prosthesis for a tooth stump, of the type indicated above, in which the coupling between the model mandible with teeth and the model tooth stump is more precise, thus ensuring a more exact positioning of the model tooth stump, and all this without significantly complicating the technician's work in the laboratory.

This purpose is achieved by means of a working model to perform a dental prosthesis for a tooth stump, of the type indicated above; wherein the model tooth stump comprises at least a first fixing means cooperating with a complementary second fixing means for integrally attaching said model tooth stump to the model mandible with teeth in a detachable manner when the first end is introduced in the cavity; said model mandible with teeth comprises at least one straight through hole which is aligned with said first fixing means; and said second fixing means passes through said through hole in order to cooperate with said first fixing means; characterized in that the model tooth stump comprises a main body made from resin by means of 3D printing and comprising the first end and the second end of said model tooth stump, and a rigid insert which comprises the at least first fixing means, said rigid insert being introduced in a housing formed at said first end in the main body, and said rigid insert being integrally attached to said main body.

The rigid insert is a part which, unlike the resin used for 3D printing, does not experience the shrinkage typical of said resin. This shrinkage only occurs in the two parts which are made from resin by means of 3D printing, i.e., in the model mandible with teeth and in the main body of the model tooth stump, but not in the rigid insert which conserves its geometry without any variations. The model tooth stump provided with the rigid insert is integrally attached in a detachable manner to the model mandible with teeth through said rigid insert the shape of which does not vary. Variations in the relative position of the model tooth stump coupled to the model mandible with teeth caused by resin shrinkage are thus significantly reduced, and better coupling precision is thereby obtained. Furthermore, under the action of the first and second fixing means cooperating with one another, the model tooth stump is kept integrally attached to the model mandible with teeth, so it cannot sustain an accidental variation in its position, for example, due to an accidental impact while the laboratory technician is working. Unlike the known solutions described above, the solution according to the invention prevents the positioning of the model tooth stump being based solely on a matching of geometries formed in two parts manufactured from resin by means of 3D printing, which matching causes misalignments due to the shrinkage of the resin. Moreover, the laboratory technician can integrally attach and separate the two parts at will by acting on the fixing means.

Although different materials can be envisaged for the rigid insert, such that said insert does not sustain noticeable variations in geometry, in preferred embodiments the rigid insert is metallic, preferably made of a ferrous alloy, for example steel.

Preferably, the rigid insert comprises two of said first fixing means and the model mandible with teeth comprises two of said through holes, each of them being aligned with one of said first fixing means in the rigid insert, and said through holes in the model mandible with teeth are arranged such that the axis of a first through hole is in the apical-coronal direction and the axis of a second through hole is in a direction other than said apical-coronal direction. More preferably, the axis of the second through hole in the model mandible with teeth is in the vestibular-lingual direction. This configuration allows for a particularly precise positioning of the model tooth stump when it is integrally attached to the model mandible with teeth by the fixing means. Furthermore, the apical-coronal direction provides easy access from the lower region of the model mandible with teeth, and the vestibular-lingual direction likewise provides easy access from the front region.

Different mechanical solutions for making the fixing means can be envisaged. For example, it is possible to envisage fixing means based on a quick closing system by means of a lever which acts on a rod pulling on the rigid insert. In the preferred embodiments, the first fixing means is a threaded hole in the rigid insert, and the second fixing means is a screw, preferably a metallic screw, passing through the through hole of the model mandible with teeth and threaded into said threaded hole of the rigid insert. This solution has the advantage of not requiring complicated shapes in the model mandible with teeth. It is sufficient to provide a seating for the head of the screw.

Preferably, the first fixing means of the rigid insert is positioned inside the housing of the main body, when said rigid insert is introduced in said housing, and said main body comprises at least one straight through hole aligned with the through hole of the model mandible with teeth and with the first fixing means in the rigid insert, such that the second fixing means passes through said through hole of the model mandible with teeth and through said through hole of the main body in order to cooperate with said first fixing means in the rigid insert. The main body thus configured is not difficult to make by 3D printing. This configuration contributes to integrally attaching the rigid insert to the main body.

Preferably, the rigid insert is introduced completely in the housing of the main body, such that said rigid insert does not protrude from said housing. This configuration prevents an interference between the rigid insert and the cavity in the model mandible with teeth, which simplifies the shape of said cavity.

In preferred embodiments, the housing is a hollow formed in the main body such that the rigid insert is introduced in said housing from the first end of the model tooth stump by translation in a direction corresponding to the apical-coronal direction when said first end is introduced in the cavity of the model mandible with teeth. This configuration facilitates making the housing in the main body and furthermore causes the rigid insert and the housing to be protected when the model tooth stump is coupled to the model mandible with teeth.

Preferably, the rigid insert has a complementary shape with respect to the shape of the housing in the main body, such that said rigid insert is snugly introduced in said housing, and said complementary shape prevents the rotation of said rigid insert with respect to said housing. This facilitates the assembly of the rigid insert in the housing and prevents positioning errors. More preferably, the rigid insert has a cylindrical shape with a planar side face, and the housing has a cylindrical shape with a planar side face, complementary to the shape of said rigid insert.

Different solutions for integrally attaching the rigid insert to the main body can be envisaged. For example, the rigid insert can be introduced in the housing under high pressure. In the preferred embodiments, the rigid insert is introduced in the housing of the main body and is integrally attached to said main body by means of an adhesive, for example, by means of a contact adhesive in liquid or gel form.

The invention also relates to a method to make the working model described above, comprising the following steps:

performing a scan of all or part of a patient's mandible with teeth, said all or part comprising at least one tooth stump, obtaining as a result of said scan at least one original data set defining the geometry of said all or part of the mandible with teeth;

creating, from said at least one original data set, a first processed data set defining the geometry of the model mandible with teeth, including the toothless space, the cavity, and the at least one through hole, and a second processed data set defining the geometry of the main body of the model tooth stump, including the housing and, where appropriate, the through hole; such that the assembly formed by said model mandible with teeth and said main body of the model tooth stump, when the first end is introduced in the cavity, has a geometry corresponding to the geometry of said all or part of the mandible with teeth defined in said at least one original data set;

manufacturing said model mandible with teeth from resin by means of 3D printing from said first processed data set;

manufacturing said main body from resin by means of 3D printing from said second processed data set;

supplying the rigid insert, introducing it in the housing of the main body, and integrally attaching it to said main body;

supplying the at least a second fixing means.

The model mandible with teeth and the main body of the model tooth stump can be performed from the same resin or from different resins. Preferably, they are performed from the same resin, and preferably with the same 3D printer.

The invention also comprises other detail features shown in the following detailed description of an embodiment of the invention and in the attached figures.

BRIEF DESCRIPTION OF THE DRAWINGS

The advantages and features of the invention are apparent from the following description in which a preferred embodiment of the invention is described in a non-limiting manner with respect to the scope of the main claim in reference to the figures.

DETAILED DESCRIPTION OF AN EMBODIMENT OF THE INVENTION

Figures 1, 2:
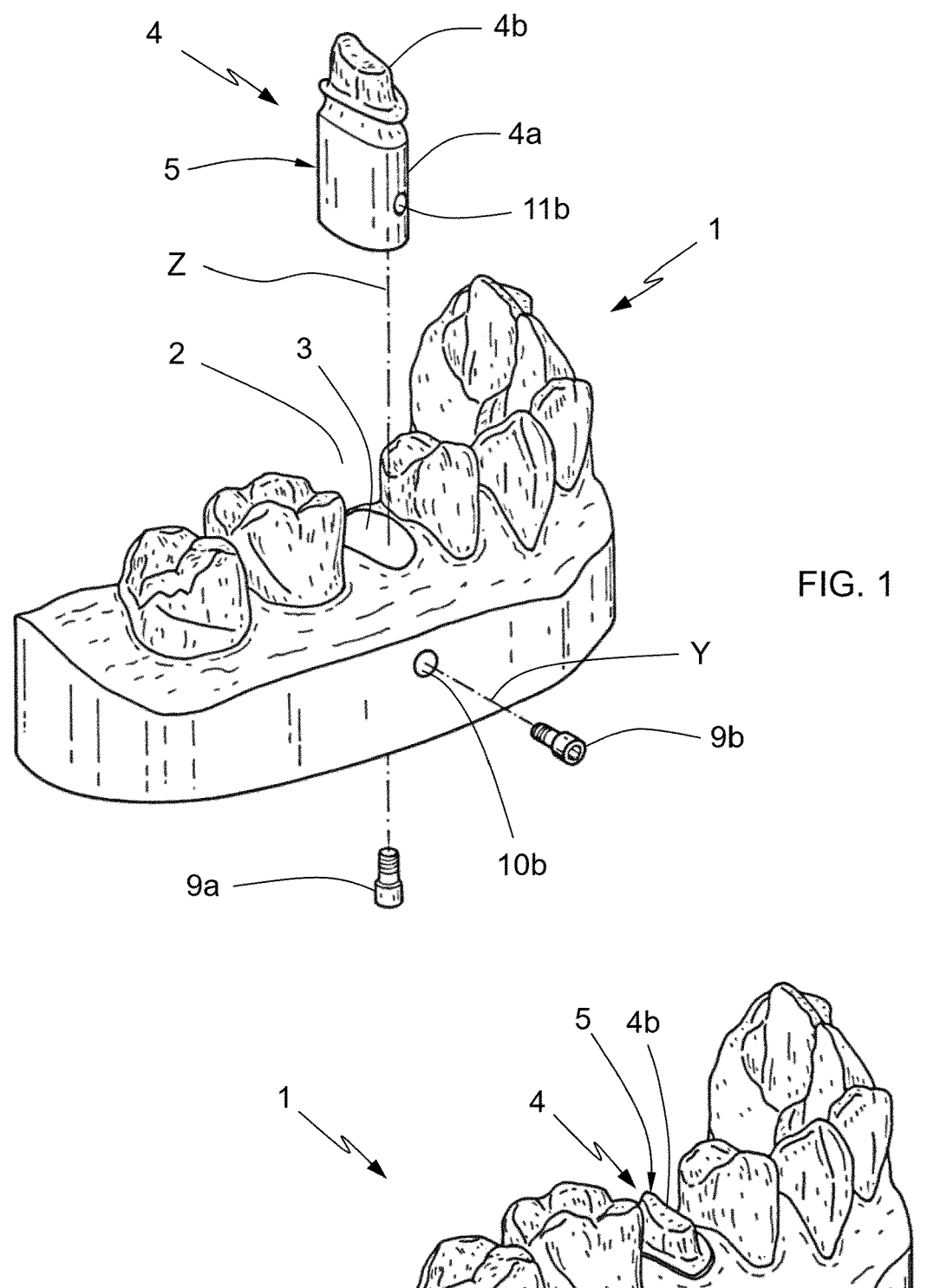
FIG. 1 is an exploded perspective view showing a model mandible with teeth, a model tooth stump, and second fixing means in the form of screws.
FIG. 2 is a perspective view similar to FIG. 1 but with the parts assembled together.

The working model depicted in the figures is used in a laboratory to perform a dental prosthesis for a tooth stump and partially reproduces a patient's mandible, including the teeth and a tooth stump. The working model is formed by two main parts: a model mandible 1 with teeth and a model tooth stump 4 which is detachably coupled to said model mandible 1 with teeth. FIG. 2 shows these two parts 1 and 4 coupled to one another.

As can be seen in FIGS. 1-3 and 6, the model mandible 1 with teeth comprises the teeth, a toothless space 2 corresponding to a missing tooth in the model mandible 1 with teeth, and a cavity 3 facing said toothless space 2. A straight through hole 10a opening into the cavity 3 and having its axis in the apical-coronal direction Z is formed on the lower face of the model mandible 1 with teeth. Another straight through hole 10b opening into the cavity 3 and having its axis in the vestibular-lingual direction Y is formed on the front face of the model mandible 1 with teeth. Both through holes 10a, 10b have a first outer segment followed by a second inner segment having a smaller diameter than the first outer segment. The difference in diameter between these two segments forms a support shoulder for the head of screws constituting second fixing means 9a, 9b, as will be described below. The model mandible 1 with teeth is a monoblock piece of resin manufactured by means of 3D printing. For example, for the 3D printing a 3D printer with SLA (stereolithography) technology is used, and the resin is a photosensitive resin that hardens when subjected to ultraviolet light.

As can be seen in FIGS. 5 and 7-9, the model tooth stump 4 is formed by a main body 5 and a rigid insert 6 introduced in a housing 7 formed in said main body 5.

Figures 10, 11:
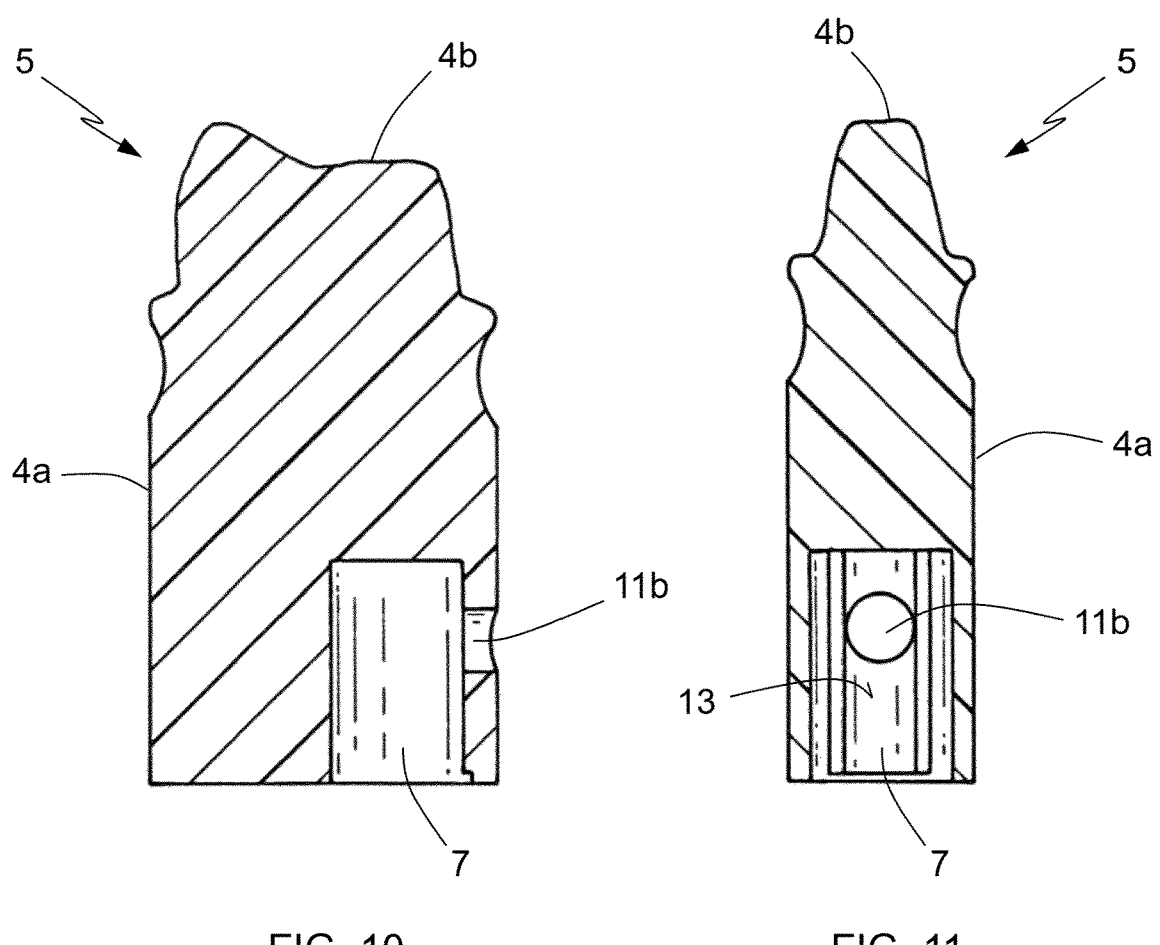
FIGS. 10, 11, and 12 are a sectioned side view, a sectioned front view, and a sectioned bottom view, respectively, of the main body.
Figure 12:
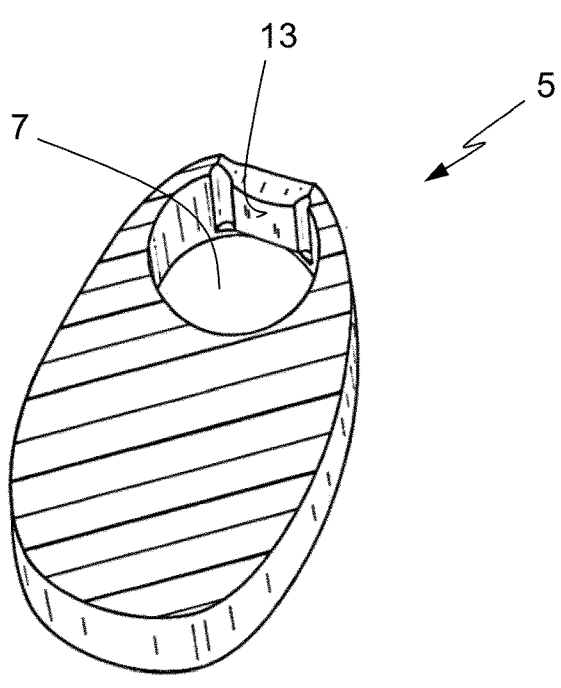
Figures 13, 14, 15, 16:
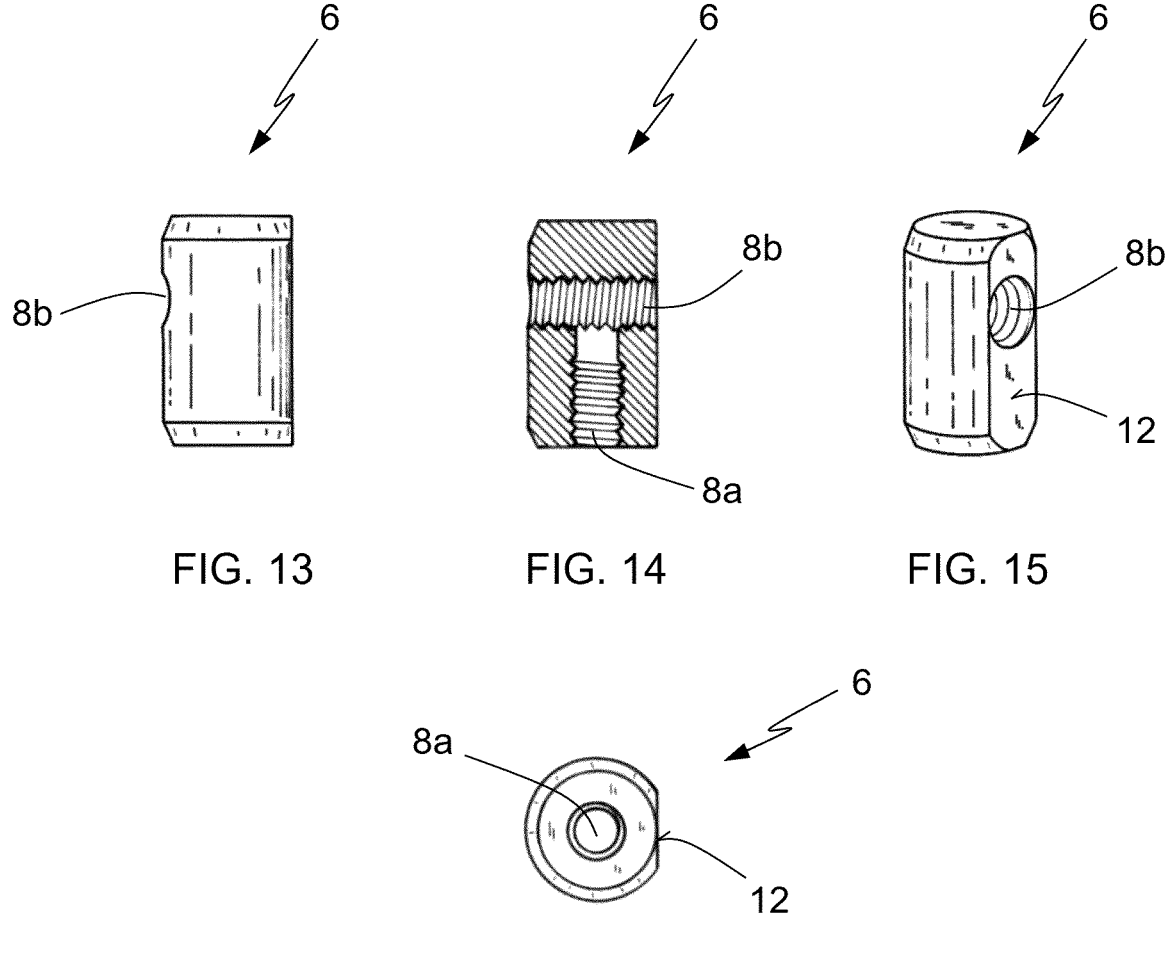
FIGS. 13, 14, 15, and 16 are a side view, a sectioned side view, a perspective view, and a bottom view, respectively, of the rigid insert.

The main body 5 is a monoblock piece of resin manufactured by means of 3D printing. Preferably, the main body 5 is manufactured with the same 3D printer and with the same resin as the model mandible 1 with teeth. The main body 5 forms a first end 4a of the model tooth stump 4, which is detachably introduced in the cavity 3 of the model mandible 1 with teeth, and a second end 4b extending from said first end 4a and being in the form of a tooth stump, corresponding to the real tooth stump in the patient's mandible. The first end 4a has an outer shape corresponding to the inner shape of the cavity 3, such that it fits snugly therein. As shown in FIGS. 10-12, the housing 7 in the main body 5 is a hollow which is formed at the first end 4a and opens into the lower face of said first end 4a, opposite the second end 4b. The housing 7 has a cylindrical shape with a planar side face 13. The central axis of this cylindrical shape has a direction corresponding to the apical-coronal direction Z when the first end 4a is introduced in the cavity 3. The main body 5 further comprises, in a front wall, a straight through hole 11b which opens into the housing 7 and is aligned with the through hole 10b of the model mandible 1 with teeth when the first end 4a is introduced in the cavity 3.

The rigid insert 6 is a monoblock piece, preferably made from metal. For example, the rigid insert 6 is made from steel. As can be seen in FIGS. 13-16, the rigid insert 6 has a cylindrical shape with a planar wall 12. The shape of the rigid insert 6 is complementary to the shape of the housing 7 in the main body 5, such that said rigid insert 6 is snugly introduced in said housing 7 by translation in the direction of the axis of the cylindrical shape of the housing 7. The complementary planar faces 12 and 13 prevent the rotation of the rigid insert 6 with respect to the housing 7. In this embodiment, the rigid insert 6 comprises two first fixing means 8a, 8b which are each a threaded hole. A first fixing means 8a is a threaded hole open on the lower face of the rigid insert 6, coaxial with the axis of the cylindrical shape of said insert. The other first fixing means 8b is a threaded hole open on the side cylindrical face of the rigid insert 6, having an axis perpendicular to the axis of the cylindrical shape of said insert.

Figures 3, 4:
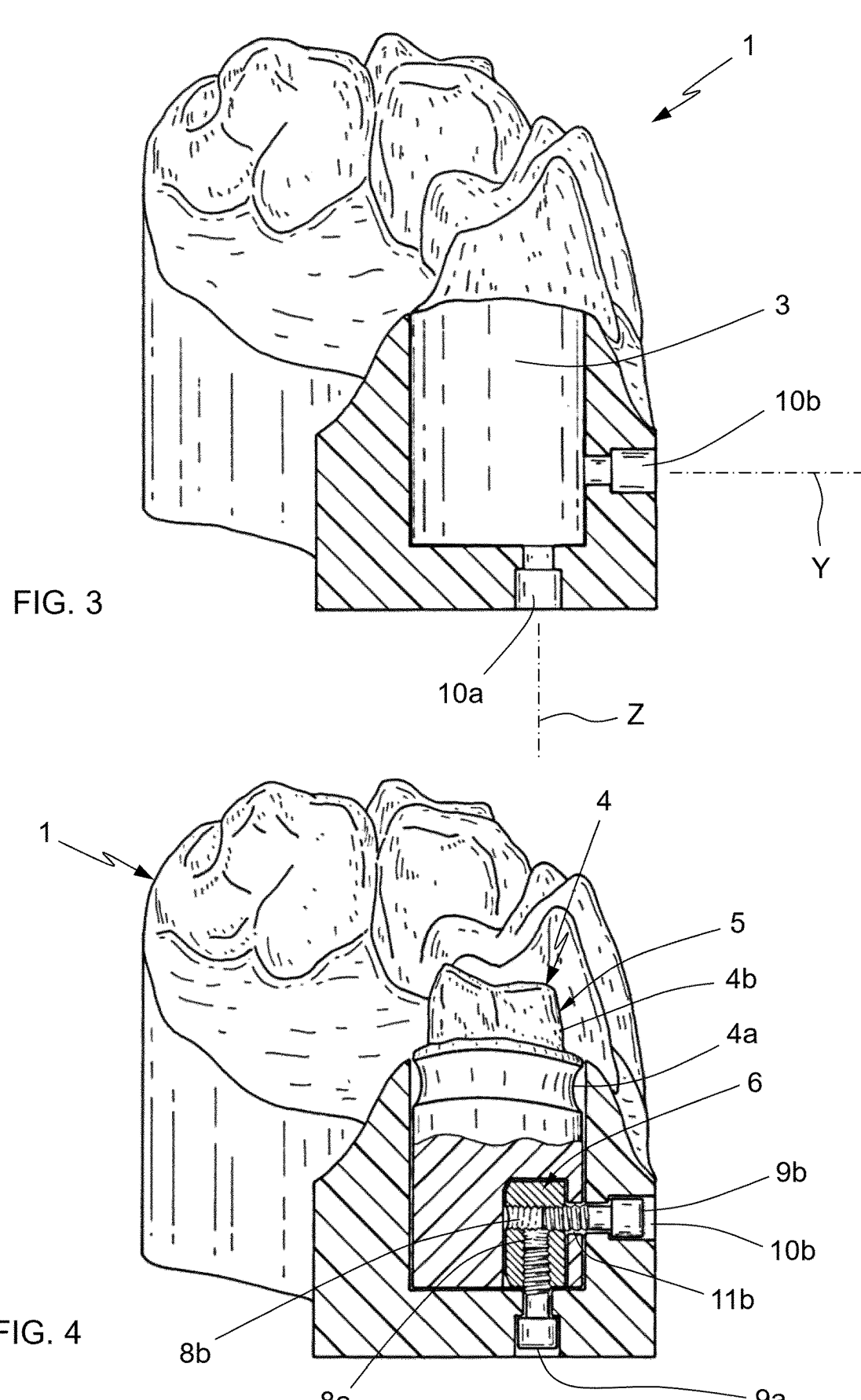
FIG. 3 is a partially sectioned side view of the model mandible with teeth.
FIG. 4 is a view similar to FIG. 3, with the model tooth stump coupled to the model mandible with teeth and integrally attached to same by the first and second fixing means in the form of threaded holes and screws.
Figure 5:
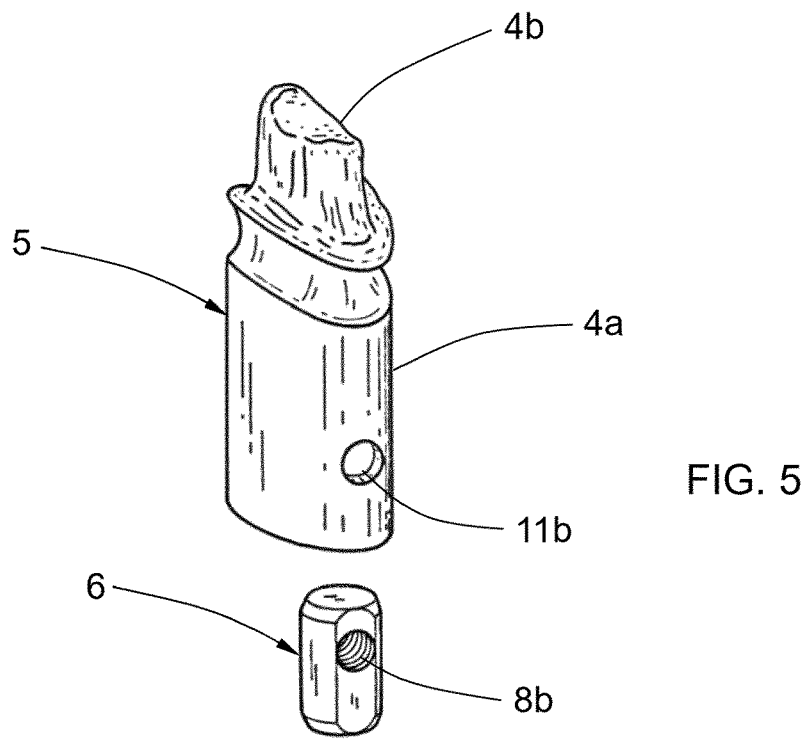
FIG. 5 is an exploded perspective view of the model tooth stump formed by the main body and the rigid insert.
Figure 6:
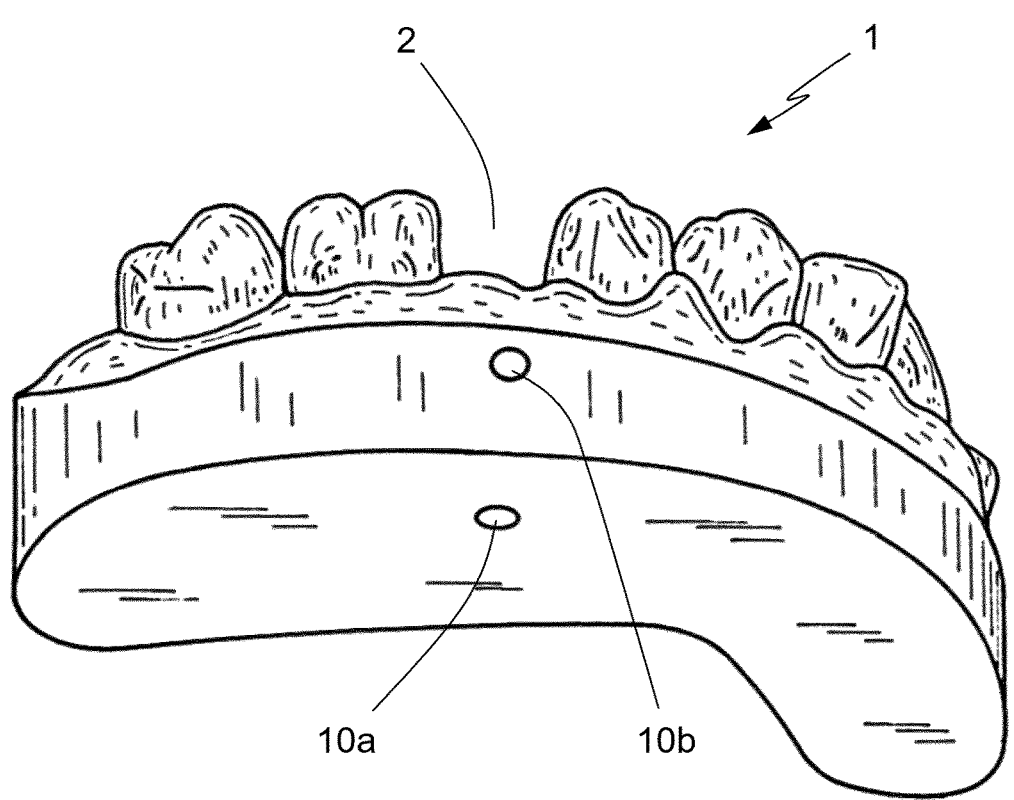
FIG. 6 is a bottom front perspective view of the model mandible with teeth.
Figure 7:
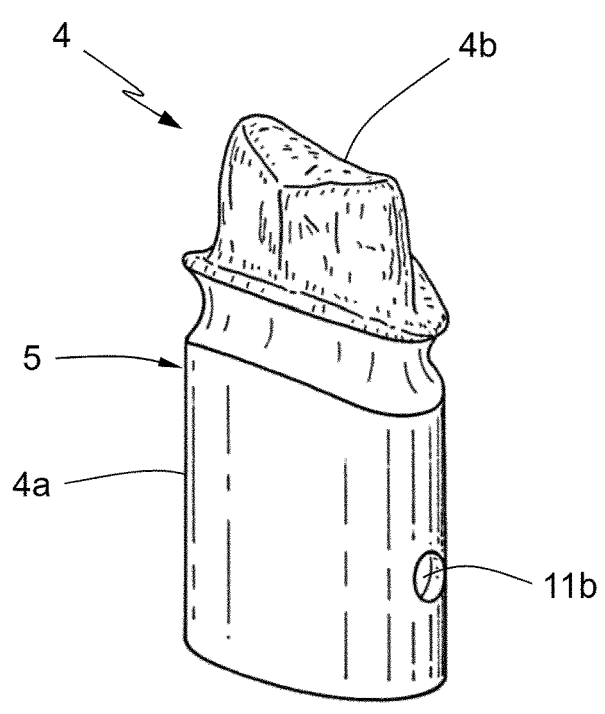
FIGS. 7, 8, and 9 are a perspective view, a side view, and a partially sectioned side view, respectively, of the model tooth stump formed by the main body and the rigid insert introduced in the housing.
Figure 8:
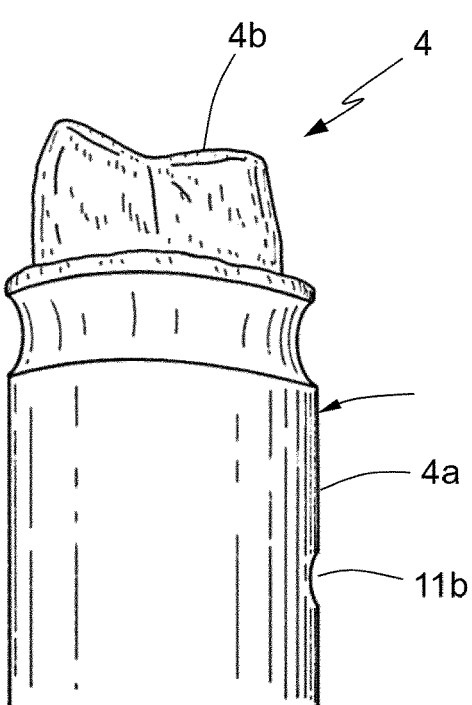
Figure 9:
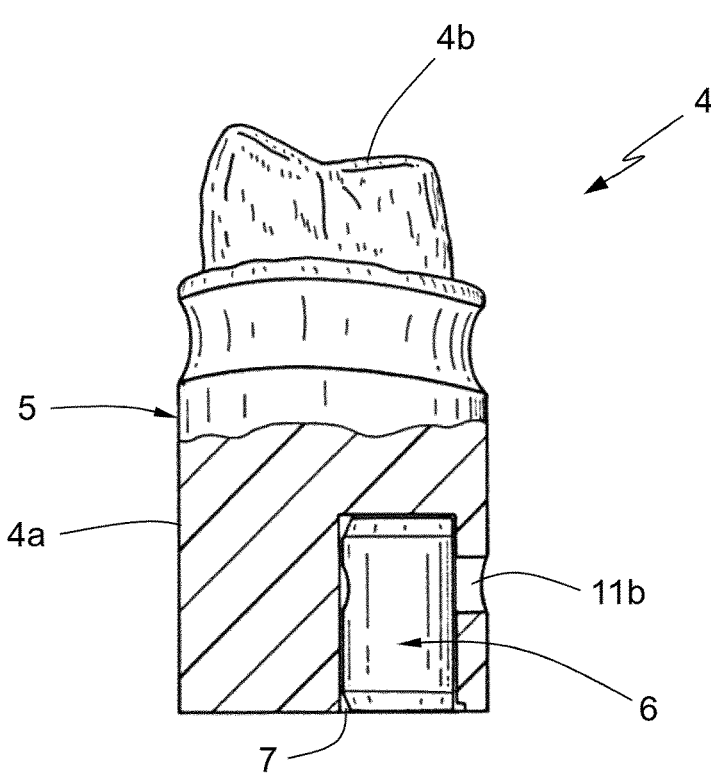

As can be seen in FIGS. 4 and 9, the rigid insert 6 is introduced completely in the housing 7, such that it does not protrude from same. The first fixing means 8*b*, which is a threaded hole in this case, is aligned with the through hole 11*b* of the first body 5. The rigid insert 6 introduced in the housing 7 is integrally attached to the main body 5 by means of an adhesive arranged in an interstitial space between the outer wall of said rigid insert 6 and the wall of the housing 7. A contact adhesive in liquid or gel form, for example, can be used.

As seen in FIG. 4, when the first end 4*a* of the model tooth stump 4 is introduced in the cavity 3, each of the two first fixing means 8*a*, 8*b* of the rigid insert 6, which are threaded holes in this case, is aligned with one of the through holes 10*a*, 10*b* of the model mandible 1 with teeth. Furthermore, the first fixing means 8*b* and the through hole 10*b* are aligned with the through hole 11*b* of the main body 5.

Two second fixing means 9*a*, 9*b* cooperating respectively with the two first fixing means 8*a*, 8*b* are used for integrally attaching the model tooth stump 4 to the model mandible 1 with teeth in a detachable manner when the first end 4*a* is introduced in the cavity 3. In the depicted example, the two second fixing means 9*a*, 9*b* are screws which are threaded into the threaded holes of the rigid insert 6 constituting the first fixing means 8*a*, 8*b*. Each second fixing means 9*a*, 9*b* in the form of a screw is introduced from outside the model mandible 1 with teeth and passes through one of the through holes 10*a*, 10*b* of said model. The second fixing means 9*b* in the form of a screw also passes through the through hole 11*b* of the main body 5.

The described working model is obtained by means of the method described below. A scan of all or part of a patient's mandible with teeth, comprising at least one tooth stump, is performed. An original data set defining the geometry of said all or part of the mandible with teeth is thus obtained. For example, this data set is a file in STL (Standard Triangle Language) format. The data file can be in any other format other than the STL format, which can be read and interpreted by a 3D printer. A first processed data set defining the geometry of the model mandible 1 with teeth, including the toothless space 2, the cavity 3, and the through holes 10*a*, 10*b*, is created from this original data set. A second processed data set defining the geometry of the main body 5 of the model tooth stump 4, including the housing 7 and the through hole 11*b*, is also created. These two processed data sets are STL files, for example, which are created using a 3D shape editing program with which the original data STL file is edited, such that the mandible with teeth is cut down and separated into two parts: the model mandible 1 with teeth and the main body 5, and all the geometries needed for the couplings, i.e., the cavity 3, the first end 4*a*, the through holes 10*a*, 10*b*, and 11*b*, and the housing 7, are created in these two parts. In these processed data STL files, the assembly formed by the model mandible 1 with teeth and the main body 5 of the model tooth stump 4, when the first end 4*a* is introduced in the cavity 3, has a geometry corresponding to the geometry of the mandible with teeth defined in the original data STL file. The model mandible 1 with teeth and the main body 5 are manufactured from resin by means of 3D printing from these first and second processed data STL files, respectively. The rigid insert 6 is introduced in the housing 7 of the main body 5 and is integrally attached to said body by means of an adhesive. Finally, the screws constituting the second fixing means 9*a*, 9*b* are supplied.

The invention claimed is:

1. A working model to perform a dental prosthesis for a tooth stump, said working model comprising:
    a model mandible with teeth, made from resin by means of 3D printing, comprising at least one toothless space, corresponding to a missing tooth in said model mandible with teeth, and at least one cavity facing said toothless space;
    a model tooth stump which is placed in said toothless space and which is detachably coupled to said model mandible with teeth, said model tooth stump comprising a first end which is detachably introduced in said cavity and a second end extending from said first end and being in the form of a tooth stump;
    wherein said model tooth stump comprises two first fixing means cooperating with two complementary second fixing means for integrally attaching said model tooth stump to said model mandible with teeth in a detachable manner when said first end is introduced in said cavity; said model mandible with teeth comprises two straight through holes, each of said through holes being aligned with one of said first fixing means; and each of said second fixing means passes through one of said through holes in order to cooperate with one of said first fixing means;
    wherein said model tooth stump comprises a main body made from resin by means of 3D printing and comprising said first end and said second end, and a rigid insert which comprises said two first fixing means, said rigid insert being introduced in a housing formed at said first end in the main body, and said rigid insert being integrally attached to said main body, and wherein said two through holes in the model mandible with teeth are arranged such that the axis of a first through hole is in the apical-coronal direction and the axis of a second through hole is in a direction other than said apical-coronal direction.

2. The working model according to claim 1, wherein said rigid insert is metallic.

3. The working model according to claim 1, wherein the axis of said second through hole in the model mandible with teeth is in the vestibular-lingual direction.

4. The working model according to claim 1, wherein each of said first fixing means is a threaded hole in said rigid insert, and each of said second fixing means is a screw passing through one of said through holes of the model mandible with teeth and threaded into said threaded hole of the rigid insert.

5. The working model according to claim 1, wherein said two first fixing means of the rigid insert is are positioned inside said housing when said rigid insert is introduced in said housing, and said main body comprises two straight through holes aligned with said two through holes of the model mandible with teeth and with said two first fixing means in the rigid insert, such that each of said second fixing means passes through one of said through holes of the model mandible with teeth and through one of said straight through holes of the main body in order to cooperate with one of said first fixing means in said rigid insert.

6. The working model according to claim 5, wherein said rigid insert is introduced completely in said housing, such that said rigid insert does not protrude from said housing.

7. The working model according to claim 1, wherein said housing is a hollow formed in said main body such that said rigid insert is introduced in said housing from said first end by translation in a direction corresponding to the apical-coronal direction when said first end of the model tooth stump is introduced in said cavity.

8. The working model according to claim 1, wherein said rigid insert has a complementary shape with respect to the shape of said housing in the main body, such that said rigid insert is snugly introduced in said housing and said complementary shape prevents the rotation of said rigid insert with respect to said housing.

9. The working model according to claim 1, wherein said rigid insert has a cylindrical shape with a planar side face, and said housing has a cylindrical shape with a planar side face, complementary to the shape of said rigid insert.

10. The working model according to claim 1, wherein said rigid insert is integrally attached to said main body by means of an adhesive.

11. A method to make the working model according to claim 1, comprising the following steps:

performing a scan of all or part of a patient's mandible with teeth, said all or part comprising at least one tooth stump, obtaining as a result of said scan at least one original data set defining the geometry of said all or part of the mandible with teeth;

creating, from said at least one original data set, a first processed data set defining the geometry of said model mandible with teeth, including said toothless space, said cavity, and said two through holes, and a second processed data set defining the geometry of said main body of the model tooth stump, including said housing; such that the assembly formed by said model mandible with teeth and said main body of the model tooth stump, when said first end is introduced in said cavity, has a geometry corresponding to the geometry of said all or part of the mandible with teeth defined in said at least one original data set;

manufacturing said model mandible with teeth from resin by means of 3D printing from said first processed data set;

manufacturing said main body from resin by means of 3D printing from said second processed data set;

supplying said rigid insert, introducing it in said housing of the main body, and integrally attaching it to said main body;

supplying said two second fixing means.

* * * * *